United States Patent
Huhn et al.

[11] Patent Number: 5,149,016
[45] Date of Patent: Sep. 22, 1992

[54] PROP JET AIRPLANE PROPELLING SYSTEM

[76] Inventors: John Huhn, 503½ Capital SW., Battle Creek, Mich. 49015; George Spector, 233 Broadway Rm. 3815, New York, N.Y. 10007

[21] Appl. No.: 645,784
[22] Filed: Jan. 25, 1991
[51] Int. Cl.⁵ .............................................. B64D 27/02
[52] U.S. Cl. .................. 244/55; 244/53 R; 244/12.3; 244/45 R
[58] Field of Search ............... 244/55, 58, 12.3, 53 R, 244/62, 65, 12.1, 45 R

[56] References Cited

U.S. PATENT DOCUMENTS

| | | | |
|---|---|---|---|
| 1,557,790 | 10/1925 | Barling | 244/45 R |
| 1,816,216 | 7/1931 | Ford | 244/55 |
| 1,842,613 | 1/1932 | Karr | 244/45 R |
| 1,878,808 | 9/1932 | Beaver | 244/45 R |
| 2,194,596 | 3/1940 | Henter | 244/45 R |
| 2,241,521 | 5/1941 | Richard | 244/45 R |
| 2,288,820 | 7/1942 | Mas | 244/55 |
| 2,339,338 | 1/1944 | Karlik | 244/55 |
| 2,526,941 | 10/1950 | Fishbein | 244/53 R |
| 2,604,276 | 7/1952 | Huben | 244/53 R |
| 2,910,254 | 10/1959 | Razak | 244/45 R |
| 2,988,301 | 6/1961 | Fletcher | 244/12.3 |
| 3,469,803 | 9/1969 | Schmielau | 244/55 |
| 4,171,786 | 10/1979 | Krenz | 244/55 |

Primary Examiner—Joseph F. Peters, Jr.
Assistant Examiner—Anne E. Bidwell

[57] ABSTRACT

A propelling system for an aircraft having a fuselage and a pair of swept wings, is provided and consists of a pair of propeller driving engines, each carried on top rearward edge of each swept wing so as to push the aircraft forward, a pair of pylons, each carried on bottom of a forward edge of each swept wing and a pair of jet engines, each affixed to a bottom end of each pylon so as to pull the aircraft forward.

2 Claims, 1 Drawing Sheet

PROP JET AIRPLANE PROPELLING SYSTEM

BACKGROUND OF THE INVENTION

The instant invention relates generally to airplanes and more specifically it relates to a propelling system for an aircraft which provides the combination of propeller engines with jet engines on the aircraft.

There are available various conventional airplanes which do not provide the novel improvements of the invention herein disclosed.

SUMMARY OF THE INVENTION

A primary object of the present invention is to provide a propelling system for an aircraft that will overcome the shortcomings of the prior art devices.

Another object is to provide a propelling system for an aircraft that combines propeller driving engines with jet engines which are carried on the wings of the aircraft for obtaining an increased forward thrust.

An additional object is to provide a propelling system for an aircraft that includes support structures to give additional support to the propeller driving engines on the wings.

A further object is to provide a propelling system for an aircraft that is simple and easy to use.

A still further object is to provide a propelling system for an aircraft that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
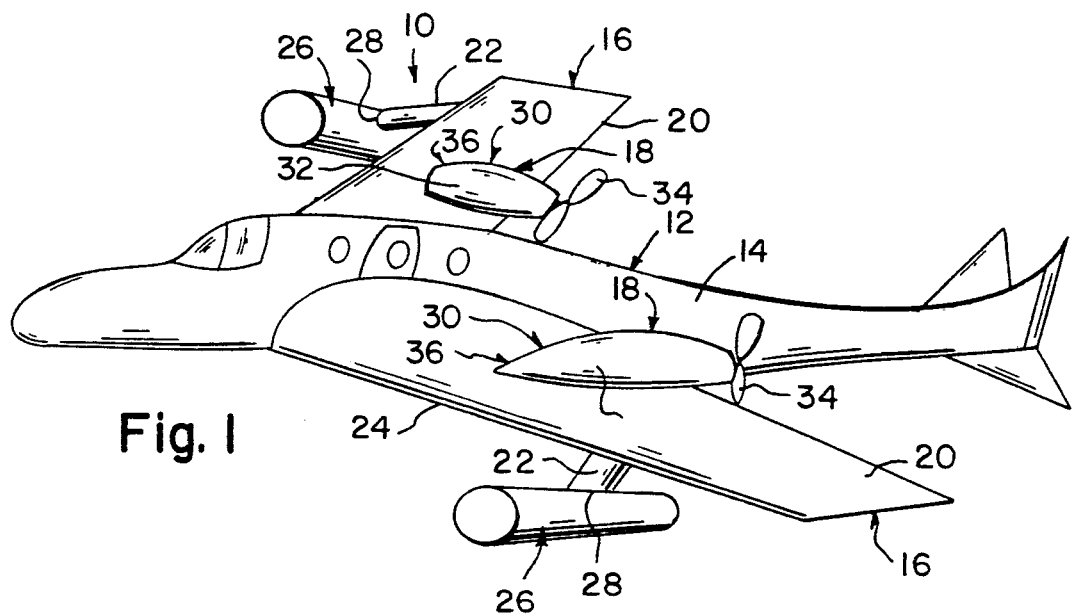
FIG. 1 is a perspective view of the instant invention on an aircraft.

Turning now descriptively to the drawings, in which similar reference characters denote similar elements throughout the several views, FIG. 1 illustrates a propelling system 10 for an aircraft 12 having a fuselage 14 and a pair of swept wings 16, consisting of a pair of propeller driving engines 18 each carried on top a rearward edge 20 of each swept wings 16 so as to push the aircraft 12 forward. A pylon 22 is carried on bottom a forward edge 24 of each swept wing 16. A jet engine 26 is affixed to a bottom end 28 of each pylon 22 so as to pull the aircraft 12 forward.

Figure 2:
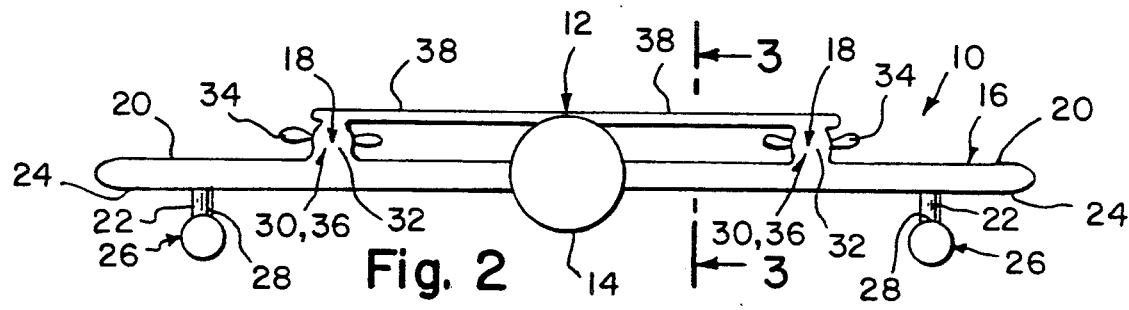
FIG. 2 is a diagrammatic front view of a modification showing airfoil support structures providing additional support for the propeller engines.
Figure 3:
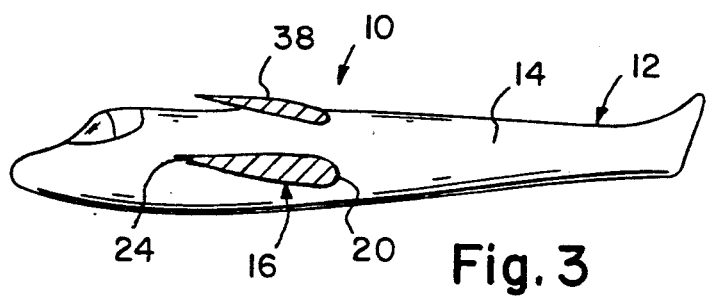
FIG. 3 is a diagrammatic cross sectional view taken along line 3—3 in FIG. 2, showing the relationship of the airfoil support structure to the wing of the aircraft.

Each propeller driving engine 18 can be a turbo prop type 30 that includes a turbo jet engine 32 to drive an external propeller 34. Each propeller driving engine 18 can also be an internal combustion engine type 36 to drive the external propeller 34. The propelling system 10, as shown in FIGS. 2 and 3, can further include a pair of airfoil support structures 38, each extending outwardly from one side of the fuselage 14 to provide additional support for one of the propeller driving engines 18.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A propelling system for an aircraft having a fuselage and a pair of swept wings, comprising:
    a) a pair of propeller driving engines, each carried on top of a rearward edge of each swept wing so as to push the aircraft forward;
    b) a pair of pylons, each carried on bottom of a forward edge of each swept wing; and
    c) a pair of jet engines, each affixed to a bottom end of each said pylon so as to pull the aircraft forward; further including a pair of airfoil support structures parallel to and spaced from said wings each extending outwardly from one side of the fuselage connected to and providing additional support for said propeller driving engines.

2. A propelling system as in claim 1, wherein said airfoil support structures are connected to the tops of the fuselage and propeller driving engines.

* * * * *